United States Patent [19]
Pohling

[11] Patent Number: 5,868,037
[45] Date of Patent: Feb. 9, 1999

[54] CABLE TENSION REGULATOR

[75] Inventor: John G. Pohling, Garden Grove, Calif.

[73] Assignee: McDonnell Douglas Corporation, Huntington Beach, Calif.

[21] Appl. No.: 889,345

[22] Filed: Jul. 8, 1997

[51] Int. Cl.$^6$ ................................................. F16C 1/22
[52] U.S. Cl. ..................................................... 74/501.5 R
[58] Field of Search .......................... 74/501.5 R, 500.5, 74/502.4, 502.6

[56] References Cited

U.S. PATENT DOCUMENTS

| | | | |
|---|---|---|---|
| 2,280,106 | 4/1942 | Sturgess | 74/501.5 R |
| 2,327,021 | 8/1943 | Cushman | 74/501 |
| 2,363,228 | 11/1944 | Cade | 74/501 |
| 2,363,229 | 11/1944 | Cade | 74/501.5 R |
| 2,787,916 | 4/1957 | Cushman | 74/501.5 |
| 2,841,030 | 7/1958 | Wrighton | 74/501.5 |
| 2,856,790 | 10/1958 | Norton | 74/501.5 |
| 2,921,480 | 1/1960 | Wrighton et al. | 74/501.5 |
| 3,266,335 | 8/1966 | Wright, Jr. | 74/501.5 |
| 3,919,897 | 11/1975 | Yang | 74/501.5 |
| 4,318,308 | 3/1982 | Monteillet | 74/501.5 |

*Primary Examiner*—Charles A. Marmor
*Assistant Examiner*—Mary Ann Battista

*Attorney, Agent, or Firm*—Senniger, Powers, Leavitt & Roedel

[57] ABSTRACT

A cable tension regulator capable of receiving an input force and transmitting an output force for use in mechanical control. The cable tension regulator comprises a pivot rod including a connector for operatively connecting the pivot rod to a support for pivoting of the rod relative to the support and a pulley mounted on the pivot rod for receiving cable. A cross bar having an opening for receiving the rod is capable of sliding longitudinally of the rod, and is constructed to hold ends of the cables. The regulator further comprises a spring having a first end held in a longitudinal position relative to the pivot rod and a second end operatively engaging and bearing against the cross bar for urging the cross bar to move on the rod in a direction generally away from the pulley to maintain tension in the cables. The regulator pivots about the transmission axis upon application of the input force. The cross bar is canted on the rod and frictionally engages the rod to lock the cross bar against movement longitudinally of the cross bar so that the spring is isolated and the input force passes substantially undiminished through the cable tension regulator for delivery by the cable tension regulator as the output force.

14 Claims, 3 Drawing Sheets

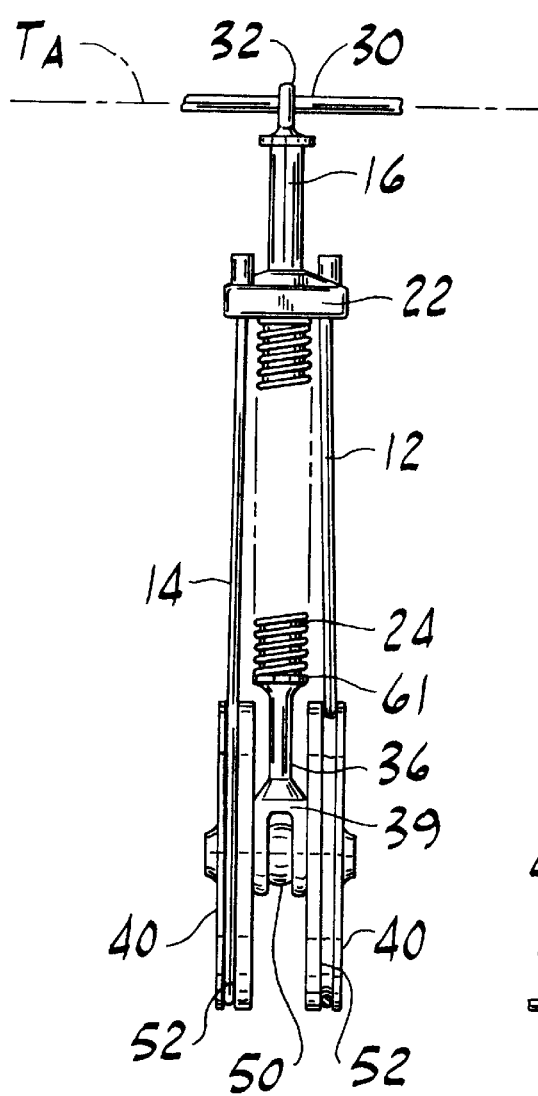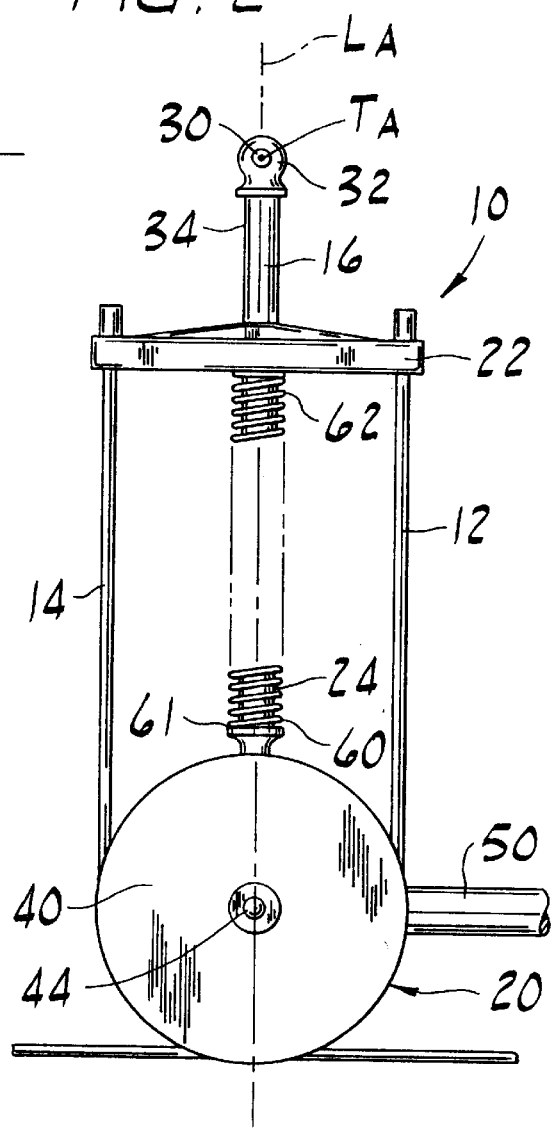

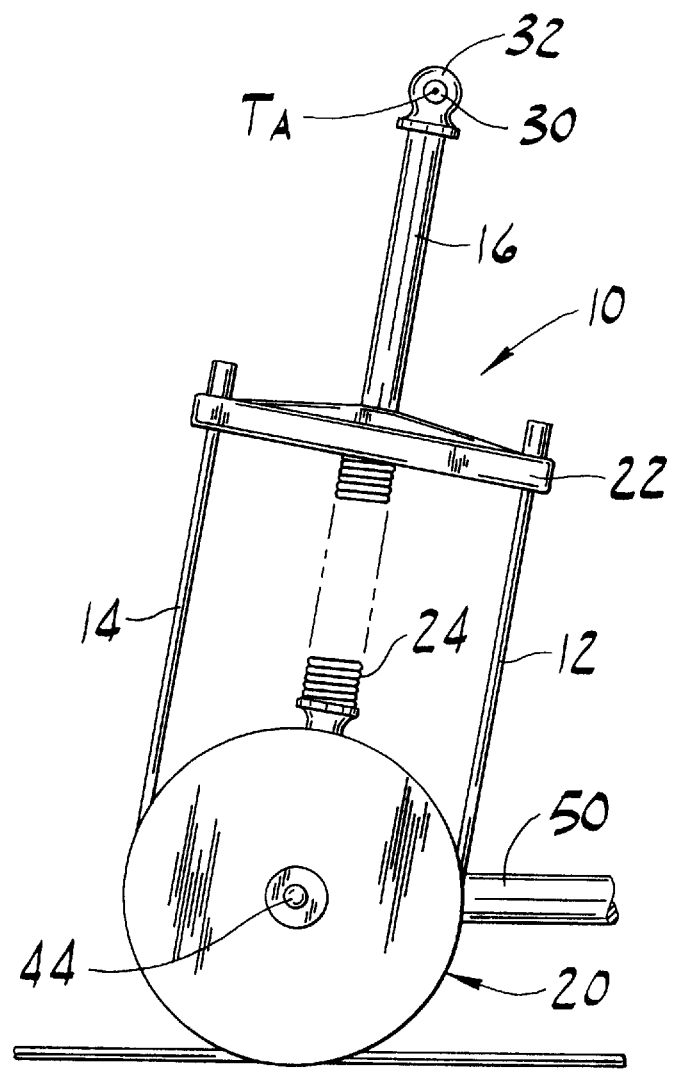

CABLE TENSION REGULATOR

BACKGROUND OF THE INVENTION

This invention relates generally to tension regulators and, more particularly, to a cable tension regulator capable of receiving an input force and transmitting an output force for use in mechanical control.

Cables are often used to control flight control surfaces such as elevators, rudders or ailerons, or valves or other mechanisms in an airplane. Control equipment in other vehicles or various other types of machinery may also employ closed loop cable control systems. Tension in cables is subject to variation due to changes in temperature, structural deflection and other environmental influences. For instance, rapid descent or acceleration of an aircraft may cause the cables to become taught or loose due to rapid airframe structural changes caused by gravitational loading on the aircraft. Since cables are often used to control flight critical surfaces, it is important that the cables are maintained constantly in tension so as not to cause loss of control.

One solution is to rig the cables in the control system so that they are under high tension. Therefore, even if there is some reduction in tension the cables will not go slack and the control surface can be controlled normally. However, high tension in the cables causes a corresponding increase in friction forces in the control system which resists movement of the cables. Thus, it is desirable to maintain as low a tension on the cables as possible without causing loss of control. Cable tension regulators are employed to permit the tension in the cables to be relatively low, but are responsive to changes in cable tension so as to constantly maintain at least a minimum tension in the cables.

Presently available tension regulators have one or more compression springs constructed to exert a tensioning force on the cables. A locking mechanism on the tension regulator locks out operation of the spring when control forces are applied to the cables. Otherwise, the spring would tend to be compressed by these forces producing lost motion in the control. The locking mechanism may operate when there is unequal tension in the cables, such as occurs when a control force is applied. However, in the absence of a control force, the spring permits contraction of the cables and also maintains a tension on the cables if they become further elongated.

In the control circuit, the control cables are connected to a pulley to either provide input to turn the pulley which in turn provides motion to an output member and effect movement of a control surface, or receive input from an input member which causes rotation of the pulley to effect movement of the cable to move a control surface. The tension regulator is frequently separate from the pulley or load transferring device and adds additional complexity and weight to the system. Tension regulators incorporated into the pulleys tend to be complex, requiring numerous parts and increasing the risk of failure. These regulators generally consist of two opposing quadrants acting as a pulley. The pulley must be large enough to take up both cable elongation and contraction and provide input and output to the system.

SUMMARY OF THE INVENTION

The present invention overcomes the deficiencies of the prior art by providing a tension regulator which directly transmits force to an output cable or rod and is operable to regulate tension in the cable. Among the features of the present invention may be noted the provision of a tension regulator which requires minimal parts is compact, lightweight and economical to manufacture.

Generally, a cable tension regulator of this invention is capable of receiving an input force and transmitting an output force for use in mechanical control. The cable tension regulator comprises a pivot rod including a connector for operatively connecting the pivot rod to a support for pivoting of the rod relative to the support about a transmission axis generally perpendicular to a longitudinal axis of the pivot rod and pulley means for receiving cables. The pulley means is mounted on the pivot rod for conjoint pivoting motion with the rod about the transmission axis. The tension regulator further comprises a cross bar having an opening therein receiving the rod through the cross bar. The cross bar is capable of sliding longitudinally of the rod and is constructed to fixedly hold ends of the cables at spaced apart locations on the cross bar. A spring having a first end held in a longitudinal position relative to the pivot rod and a second end operatively engaging and bearing against the cross bar urges the cross bar to move on the rod in a direction generally away from the pulley means to maintain at least a minimum tension in the cable while permitting elongation and contraction of the cables. The cable tension regulator pivots about the transmission axis upon application of the input force, the cables having an unequal tension as a result of the input force whereby the cross bar is canted on the rod and frictionally engages the rod to lock the cross bar against movement longitudinally of the cross bar so that the spring is isolated and the input force passes substantially undiminished through the cable tension regulator for delivery by the cable tension regulator as the output force.

Other objects and features will be in part apparent and in part pointed out hereinafter.

BRIEF DESCRIPTION OF DRAWINGS

FIG. 1 is a front elevational view of a cable tension regulator of the present invention;

FIG. 2 is a left side elevational view of the cable tension regulator of FIG. 1;

FIG. 5 is a front elevational view of the cable tension regulator of FIG. 1 in a locked position.

Corresponding reference characters indicate corresponding parts throughout the several views of the drawings.

DESCRIPTION OF THE PREFERRED EMBODIMENTS

Figure 3:
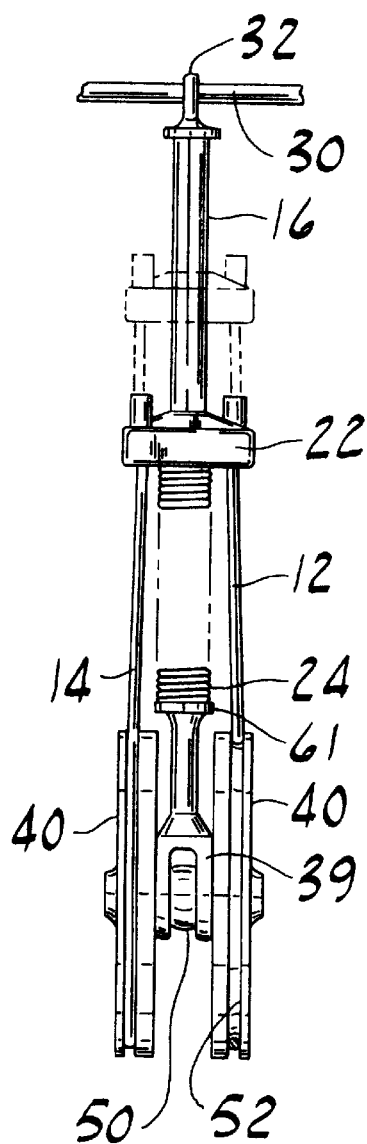
FIG. 3 is a front elevational view of the cable tension regulator of FIG. 1 in a cable regulating position.

Referring now to the drawings, and first to FIGS. 1 and 2, a cable tension regulator of the present invention generally indicated at 10 is capable of receiving an input force and transmitting an output force for use in mechanical control of flight controls of an aircraft. The regulator 10 is also used to control tension in cables 12, 14 controlling an elevator of an MD-90, for example. The regulator 10 may also be used to control tension in cable control systems for controlling other surfaces or devices in an aircraft, helicopter, spacecraft, or in cable control systems used in other applications in which it is important to maintain constant tension in the cable.

The cable tension regulator 10 comprises a pivot rod 16 operatively connected to a support at one end for pivoting of the rod relative to the support about a transmission axis $T_A$ generally perpendicular to a longitudinal axis $L_A$ of the pivot rod. The support is not illustrated but can be the frame of an airplane or other structure capable of supporting the loads experienced by the cable tension regulator 10. A pulley, generally indicated at 20, is mounted on the opposite end of the pivot rod 16. A cross bar 22 slidingly received on the rod 16 has ends of cables 12, 14 attached to it on opposite sides of the rod, and a spring 24 is located between the cross bar and the pulley. The cross bar 22 is capable of sliding along the length of the pivot rod 16 to accommodate shortening or elongation of the cables 12, 14 or their paths, while maintaining at least a minimum tension in the cables. The longitudinal motion of the cross bar 22 and the compression of the spring 24 with this movement may be seen by comparing FIGS. 1 and 2 with FIGS. 3 and 4. The longitudinal motion of the cross bar 22 is permitted so long as the tension in the cables 12, 14 is approximately equal. However, as described more fully hereinafter, when the tension is unequal in the cables 12, 14 the cross bar 22 is locked in its longitudinal position on the pivot rod 16.

The pivot rod 16 is connected to a shaft 30 at its upper end 34, which is connected to the supporting structure of an aircraft, for example. The upper end 34 of the pivot rod 16 includes a connector or ring member 32 for receiving the shaft 30 in a direction generally perpendicular to the pivot rod for pivotally mounting the cable tension regulator 10. The ring 32 may be fixedly connected to the shaft 30 for conjoint, torque transmitting pivoting of the shaft about the transmission axis $T_A$, which generally coincides with the longitudinal axis of the shaft. However, as discussed more fully hereinafter, the ring member 32 may also pivot freely with respect to the shaft 30. The ring 32 may be integrally formed as part of the pivot rod 16 or may be formed separately and threaded onto the rod, for example. The opposite (second) end 36 of the pivot rod 16 includes an opening extending through the rod generally parallel to the transmission axis $T_A$ for mounting the pulley 20 as described below.

The pulley 20 (broadly "pulley means") is mounted on the pivot rod 16 for conjoint pivoting motion with the rod about the transmission axis $T_A$. The pulley 20 comprises two pulley members 40 arranged in opposed relation with respect to each other and carried by a shaft 44. The second end 36 of the pivot rod 16 includes a clevis 39 through which shaft 44 passes and pushrod 50 is connected. The pulley members 40 are provided with circumferential grooves 52 for receiving respective ones of the cables 12, 14. Other configurations, such as a single pulley member (not shown) which receives portions of both cables, are also envisioned. The shaft 44 extends generally through the centers of the pulley members 40 to connect the pulley members, and through an opening in the clevis 39 of the second end 36 of the pivot rod 16. The shaft 44 is connected with the pivot rod 16 so that as the rod pivots about the transmission axis $T_A$, the pulley members 40 pivot conjointly with the rod about the axis. The arrangement of the pulley 20, pushrod 50 and pivot rod 16 may be different than shown without departing from the scope of the invention.

The cables 12, 14 each extend around respective pulley members 40 and have one end fixedly held by the cross bar 22 at a location adjacent an end of the cross bar. The ends of the cables 12, 14 are held by the cross bar 22 at locations approximately equidistant from the longitudinal axis $L_A$ of the pivot rod 16. The opposite ends of the cables 12, 14 either extend to a mechanism which is to be controlled, such as an elevator in an aircraft, or to a control input, such as a steering column or pedal. The cross bar 22 has an opening for receiving the pivot rod 16 through the cross bar, and the cross bar is free to slide longitudinally along the rod. The opening is located in approximately the center of the cross bar 22.

In the illustrated embodiment, the spring 24 is a coil compression spring received around the pivot rod 16. A first end 60 bears against a seat 61 formed integrally with the pivot rod 16. The seat 61 holds the first end 60 in a longitudinal position relative to the pivot rod. A second end 62 of the spring 24 operatively engages and bears against the cross bar 22 for urging the cross bar to move on the rod in a direction generally away from the pulley 20 to maintain a minimum tension in the cables 12, 14 while permitting elongation and contraction of the cables.

The cross bar 22 may include cam levers, hydraulically actuated brakes or any other device known by those skilled in the art for locking the cross bar in place upon canting of the cross bar due to unequal tension in the cables 12, 14. However, preferably the cross bar 22 should be of simple construction, relying upon frictional engagement of the cross bar with the pivot rod 16 to lock the cross bar.

In operation, the cables 12, 14 may either deliver an input force to the tension regulator 10, or receive an output force from the tension regulator. In the illustrated embodiment, the pushrod 50 either receives the output from the tension regulator 10 or provides an input force to the tension regulator. As one alternative, the pushrod 50 may be omitted and the shaft 30 on which the pivot rod 16 is mounted may receive the output force (in the form of a torque) from the tension regulator 10, or provide the input force to the tension regulator.

Figure 4:
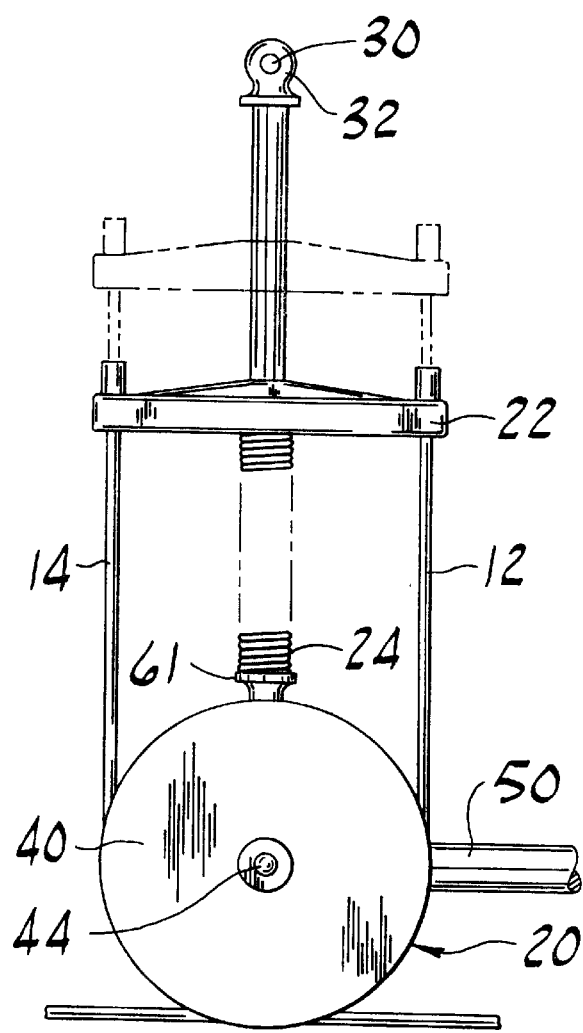
FIG. 4 is a left side elevational view of the cable tension regulator of FIG. 3.

In use, when a control force is not being applied to the system, the spring 24 maintains a load on the cables 12, 14. As the cables 12, 14 tend to lengthen and shorten due to temperature changes or airframe deflection, for example, the springs 24 yield or expand to maintain the cables 12, 14 under at least a minimum load at all times (FIGS. 3 and 4).

To illustrate the operation of the tension regulator 10 it will be assumed that the input force is applied by the cables 12, 14. An input force applied to the cables 12, 14, such as by turning a wheel, or moving a steering column or a pedal, causes an unequal tension in the cables. The unequal tension causes the cross bar 22 to become canted on the pivot rod 16 because the ends of the cables 12, 14 pull down on opposite ends of the cross bar with a different force (FIG. 5). The cross bar 22 becomes wedged on the pivot rod 16, thereby locking itself in a longitudinal position on the pivot rod. Thus, the input force applied by the cables 12, 14 to the tension regulator 10 is not accommodated by the spring 24, but is transferred substantially undiminished through the cable tension regulator. When the unequal tension on the cables 12, 14 is removed, the spring 24 urges the cross bar 22 back to its uncanted configuration where it is free to move along the length of the pivot rod 16.

A further result of the application of the input force, in the form of an unequal tension on the cables 12, 14, is that the pivot rod 16 pivots on the shaft 30 about the transmission axis $T_A$. The pushrod 50 attached to the pivot rod 16 is moved along with the swinging pivot rod (to the left as shown in FIG. 5). The pushrod 50 pivots with respect to the pulley 20 so that the motion of the pushrod is generally linear as the cable tension regulator 10 swings. It is readily understood that a reversal of which cable 12, 14 has the greater tension, will result in pivoting of the cable tension regulator 10 in the opposite direction. As illustrated in FIG. 5, it is cable 12 which has the greater tension.

Moreover, it is understood that the pivoting of the cable tension regulator 10 could be output as a torque on the shaft 30. It is further understood that pivoting of the cable tension regulator 10 could be caused not by application of unequal tension to the cables 12, 14 at a remote location, but rather by pushing or pulling of the pushrod 50, or a torque applied from the shaft 30. In either event, the pivoting of the cable tension regulator 10 would result in an unequal tension on the cables 12, 14, causing the cross bar 22 to lock and an output force to be transferred to the cables. The cables 12, 14 would be attached to some remote control surface or other mechanism (not shown) which would be moved as a result of the force from the cables.

It will be observed from the foregoing that the tension regulator 10 of this invention has numerous advantages over the prior art. Importantly, the pulley members 40 of the tension regulator 10 take up cable elongation and contraction only and are thus small in diameter. In order to move cables 12, 14 or for the tension regulator 10 to be moved by the cables, the entire regulator pivots about axis $T_A$. The tension regulator 10 is operable to transfer input forces directly through the regulator for delivery by the tension regulator as the output force. Furthermore, the arrangement of the regulator allows for a reduction in parts resulting in a lightweight, compact and reliable device.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A cable tension regulator capable of receiving an input force and transmitting an output force for use in mechanical control, the cable tension regulator comprising:

a pivot rod including a connector for operatively connecting the pivot rod to a support for pivoting of the rod relative to the support about a transmission axis generally perpendicular to a longitudinal axis of the pivot rod;

pulley means for receiving cables, said pulley means being mounted on the pivot rod for conjoint pivoting motion with the rod about the transmission axis;

a cross bar having an opening therein receiving the rod through the cross bar, the cross bar being capable of sliding longitudinally of the rod and being constructed to fixedly hold ends of the cables at spaced apart locations on the cross bar;

a spring having a first end held in a longitudinal position relative to the pivot rod and a second end operatively engaging and bearing against the cross bar for urging the cross bar to move on the rod in a direction generally away from said pulley means to maintain at least a minimum tension in the cables while permitting elongation and contraction of the cables;

the cable tension regulator pivoting about the transmission axis upon application of the input force, the cables having an unequal tension as a result of the input force whereby the cross bar is canted on the rod and frictionally engages the rod to lock the cross bar against movement longitudinally of the cross bar so that the spring is isolated and the input force passes substantially undiminished through the cable tension regulator for delivery by the cable tension regulator as the output force.

2. A cable tension regulator as set forth in claim 1 wherein the connector comprises a ring member mounted on a first end of the pivot rod, the ring member being constructed to receive a shaft therein extending generally perpendicular to the pivot rod for pivotally mounting the cable tension regulator.

3. A cable tension regulator as set forth in claim 2 wherein said pulley means is mounted generally at a second end of the pivot rod opposite the first end of the rod.

4. A cable tension regulator as set forth in claim 1 in combination with the cables, the ends of the cables being fixedly held by the cross bar.

5. A cable tension regulator as set forth in claim 4 further comprising a pushrod mounted on the pivot rod at a location spaced from the connector, one of the cables and pushrod constituting an input for delivering the input force to the cable tension regulator and the other of the cables and pushrod constituting an output for transmitting the output force from the cable tension regulator.

6. A cable tension regulator as set forth in claim 5 wherein the pushrod is pivotally connected to the pivot rod generally coaxially with said pulley means.

7. A cable tension regulator as set forth in claim 4 wherein the connector is adapted for fixed connection to a shaft for conjoint, torque transmitting pivoting with the shaft about the axis of the shaft, one of the connector and cables constituting an input for delivering the input force to the cable tension regulator and the other of the connector and cables constituting an output for transmitting the output force from the cable tension regulator.

8. A cable tension regulator as set forth in claim 4 wherein the opening in the cross bar is located generally in the center of the cross bar, the cross bar being constructed for holding the ends of the cables at locations on the cross bar which are on opposite sides of the pivot rod and generally equally spaced from the longitudinal axis of the pivot rod.

9. A cable tension regulator capable of receiving an input force and transmitting an output force for use in mechanical control, the cable tension regulator comprising:

a pivot rod including a connector mounted on a first end of the pivot rod for operatively connecting the pivot rod to a support for pivoting of the rod relative to the support about a transmission axis generally perpendicular to a longitudinal axis of the pivot rod;

a pulley for receiving a pair of cables for directing the cables generally parallel to the pivot rod, the pulley being mounted on the pivot rod generally at a second end of the pivot rod opposite the first end for conjoint pivoting motion with the pivot rod about the transmission axis;

a cross bar having a central opening therein receiving the rod through the cross bar, the cross bar being capable of sliding longitudinally of the rod and being constructed to fixedly hold ends of the cables at locations on the cross bar on opposite sides of the pivot rod and generally equally spaced from the longitudinal axis of the pivot rod;

a coil compression spring received around the pivot rod, the pivot rod having a seat formed therein and the spring having a first end bearing against the seat and a second end bearing against the cross bar for urging the cross bar to move on the rod in a direction generally away from the pulley to maintain at least a minimum tension in the cables while permitting elongation and contraction of the cables;

the cable tension regulator pivoting about the transmission axis upon application of the input force, the cables having an unequal tension as a result of the input force whereby the cross bar is canted on the rod and frictionally engages the rod to lock the cross bar against movement longitudinally of the cross bar so that the spring is isolated and the input force passes substantially undiminished through the cable tension regulator for delivery by the cable tension regulator as the output force.

10. A cable tension regulator as set forth in claim 9 wherein the connector is constructed to receive a shaft therein extending generally perpendicular to the pivot rod for pivotally mounting the cable tension regulator.

11. A cable tension regulator as set forth in claim 9 in combination with the pair of cables.

12. A cable tension regulator as set forth in claim 11 further comprising a pushrod mounted on the pivot rod at a location spaced from the connector, one of the cables and pushrod constituting an input for delivering the input force to the cable tension regulator and the other of the cables and pushrod constituting an output for transmitting the output force from the cable tension regulator.

13. A cable tension regulator as set forth in claim 12 wherein the pushrod is pivotally connected to the pivot rod generally coaxially with said pulley.

14. A cable tension regulator as set forth in claim 11 wherein the connector is adapted for fixed connection to a shaft for conjoint, torque transmitting pivoting with the shaft about the axis of the shaft, one of the connector and cables constituting an input for delivering the input force to the cable tension regulator and the other of the connector and cables constituting an output for transmitting the output force from the cable tension regulator.

* * * * *